United States Patent
Kean et al.

(10) Patent No.: US 8,154,800 B2
(45) Date of Patent: Apr. 10, 2012

(54) MULTIPLE-VIEW DIRECTIONAL DISPLAY

(75) Inventors: Diana Ulrich Kean, Oxfordshire (GB); Jonathan Mather, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 855 days.

(21) Appl. No.: 11/994,674

(22) PCT Filed: Jul. 7, 2006

(86) PCT No.: PCT/JP2006/314014
§ 371 (c)(1),
(2), (4) Date: Oct. 7, 2008

(87) PCT Pub. No.: WO2007/007860
PCT Pub. Date: Jan. 18, 2007

(65) Prior Publication Data
US 2009/0168164 A1     Jul. 2, 2009

(30) Foreign Application Priority Data
Jul. 8, 2005  (GB) .................................. 0513967.0

(51) Int. Cl.
*G02B 27/26* (2006.01)
*G02B 27/22* (2006.01)
*G03B 21/14* (2006.01)

(52) U.S. Cl. ............. 359/464; 359/462; 359/463; 353/7

(58) Field of Classification Search .................. 359/462, 359/463, 464, 465; 353/7
See application file for complete search history.

(56) References Cited

U.S. PATENT DOCUMENTS

| | | | |
|---|---|---|---|
| 5,905,593 A * | 5/1999 | Lo et al. ........................ | 359/463 |
| 6,570,623 B1 | 5/2003 | Li et al. | |
| 7,070,278 B2 * | 7/2006 | Pezzaniti ........................... | 353/7 |
| 7,372,629 B2 * | 5/2008 | Uehara et al. .................. | 359/463 |
| 2004/0218245 A1 | 11/2004 | Kean et al. | |
| 2005/0111100 A1 | 5/2005 | Mather et al. | |
| 2005/0276071 A1 | 12/2005 | Sasagawa et al. | |

FOREIGN PATENT DOCUMENTS

| | | |
|---|---|---|
| GB | 2 405 519 | 3/2005 |
| GB | 2 405 542 | 3/2005 |
| GB | 2 422 737 | 8/2006 |
| JP | 2001-013457 | 1/2001 |
| KR | 2004-0083384 A | 10/2004 |
| WO | 99/62734 | 12/1999 |
| WO | 2004/027492 | 4/2004 |

OTHER PUBLICATIONS

International Search Report for corresponding Application No. PCT/JP2006/314014 mailed Oct. 24, 2006.
British Search Report for corresponding Application No. GB0513967.0 dated Sep. 16, 2005.
PCT/ISA/237.

* cited by examiner

*Primary Examiner* — Audrey Y Chang
(74) *Attorney, Agent, or Firm* — Renner, Otto, Boisselle & Sklar, LLP

(57) ABSTRACT

A multiple view directional display comprises a pixellated image display layer having a plurality of first pixels (P1) assigned to display a first image and a plurality of second pixels (P2) assigned to display a second image, and a parallax barrier aperture array (21) for directing light from the first pixels generally into a first viewing window (2) and for directing light from the second pixels generally into a second viewing window (3) not overlapping the first viewing window. The display further comprises first light directing means (31) for re-directing light emitted from a first lateral edge region (25) of each first pixel away from the second viewing window.

6 Claims, 14 Drawing Sheets

MULTIPLE-VIEW DIRECTIONAL DISPLAY

TECHNICAL FIELD

The present invention relates to a multiple-view directional display, which displays two or more images such that each image is visible from a different direction. Thus, two observers who view the display from different directions will see different images to cone another. Such a display may be used as, for example, an autostereoscopic display device or a dual view display device.

BACKGROUND ART

For many years conventional display devices have been designed to be viewed by multiple users simultaneously. The display properties of the display device are made such that viewers can see the same good image quality from different angles with respect to the display. This is effective in applications where many users require the same information from the display—such as, for example, displays of departure information at airports and railway stations. However, there are many applications where it would be desirable for individual users to be able to see different information from the same display. For example, in a motor car the driver may wish to view satellite navigation data, for example GPS data, while a passenger may wish to view a film, as illustrated schematically in FIG. 1. These conflicting needs could be satisfied by providing two separate display devices, but this would take up extra space and would increase the cost. Furthermore, if two separate displays, i.e., a passenger's display 70 and a driver's display 80 were used in this example it would be possible for the driver to see the passenger's display 70 if the driver moved his or her head, which would be distracting for the driver. As a further example, each player in a computer game for two or more players may wish to view the game from his or her own perspective. This is currently done by each player viewing the game on a separate display screen so that each player sees their own unique perspective on individual screens. However, providing a separate display screen for each player takes up a lot of space and is costly, and is not practical for portable games.

To solve these problems, multiple-view directional displays have been developed. One application of a multiple-view directional display is as a 'dual-view display', which can simultaneously display two or more different images, with each image being visible only in a specific direction—so an observer viewing the display device from one direction will see one image whereas an observer viewing the display device from another, different direction will see a different image. A display that can show different images to two or more users provides a considerable saving in space and cost compared with use of two or more separate displays.

Examples of possible applications of multiple-view directional display devices have been given above, but there are many other applications. For example, they may be used in aeroplanes where each passenger is provided with their own individual in-flight entertainment programmes. Currently each passenger is provided with an individual display device, typically in the back of the seat in the row in front. Using a multiple view directional display could provide considerable savings in cost, space and weight since it would be possible for one display to serve two or more passengers while still allowing each passenger to select their own choice of film.

A further advantage of a multiple-view directional display is the ability to preclude the users from seeing each other's views. This is desirable in applications requiring security such as banking or sales transactions, for example using an automatic teller machine (ATM), as well as in the above example of computer games.

A further application of a multiple view directional display is in producing a three-dimensional display. In normal vision, the two eyes of a human perceive views of the world from different perspectives, owing to their different location within the head. These two perspectives are then used by the brain to assess the distance to the various objects in a scene. In order to build a display which will effectively display a three dimensional image, it is necessary to re-create this situation and supply a so-called "stereoscopic pair" of images, one image to each eye of the observer.

Three dimensional displays are classified into two types depending on the method used to supply the different views to the eyes. A stereoscopic display typically displays both images of a stereoscopic image pair over a wide viewing area. Each of the views is encoded, for instance by colour, polarisation state, or time of display. The user is required to wear a filter system of glasses that separate the views and let each eye see only the view that is intended for it.

An autostereoscopic display displays a right-eye view and a left-eye view in different directions, so that each view is visible only from respective defined regions of space. The region of space in which an image is visible across the whole of the display active area is termed a "viewing window". If the observer is situated such that their left eye is in the viewing window for the left eye view of a stereoscopic pair and their right eye is in the viewing window for the right-eye image of the pair, then a correct view will be seen by each eye of the observer and a three-dimensional image will be perceived. An autostereoscopic display requires no viewing aids to be worn by the observer.

An autostereoscopic display is similar in principle to a dual-view display. However, the two images displayed on an autostereoscopic display are the left-eye and right-eye images of a stereoscopic image pair, and so are not independent from one another. Furthermore, the two images are displayed so as to be visible to a single observer, with one image being visible to each eye of the observer.

For a flat panel autostereoscopic display, the formation of the viewing windows is typically due to a combination of the picture element (or "pixel") structure of the image display unit of the autostereoscopic display and an optical element, generically termed a parallax optic. An example of a parallax optic is a parallax barrier, which is a screen with transmissive regions, often in the form of slits, separated by opaque regions. This screen can be set in front of or behind a spatial light modulator (SLM) having a two-dimensional array of picture elements to produce an autostereoscopic display.

FIG. 2 is a plan view of a conventional multiple view directional device, in this case an autostereoscopic display. The directional display 1 consists of a spatial light modulator (SLM) 4 that constitutes an image display device, and a parallax barrier 5. The SLM of FIG. 2 is in the form of a liquid crystal display (LCD) device having an active matrix thin film transistor (TFT) substrate 6, a counter-substrate 7, and a liquid crystal layer 8 disposed between the substrate 6 and the counter substrate 7. The SLM is provided with addressing electrodes (not shown) which define a plurality of independently-addressable picture elements or "pixels", and is also provided with alignment layers (not shown) for aligning the liquid crystal layer. Viewing angle enhancement films 9 and linear polarisers 10 are provided on the outer surface of each substrate 6, 7. Illumination 11 is supplied from a backlight (not shown).

The parallax barrier 5 comprises a substrate 12 with a parallax barrier aperture array 13 formed on its surface adjacent the SLM 4. The aperture array comprises transparent apertures 15 separated by opaque portions 14. The apertures 15 are vertically extending (that is, extending into the plane of the paper in FIG. 2), and have the form of slits. An anti-reflection (AR) coating 16 is formed on the opposite surface of the parallax barrier substrate 12 (which forms the output surface of the display 1).

The pixels of the SLM 4 are arranged in rows and columns with the columns extending into the plane of the paper in FIG. 2. The pixel pitch (the distance from the centre of one pixel to the centre of an adjacent pixel) in the row or horizontal direction is p. The width of the vertically-extending transmissive slits 15 of the aperture array 13 is 2w and the horizontal pitch of the transmissive slits 15 is b. The plane of the barrier aperture array 13 is spaced from the plane of the liquid crystal layer 8 by a distance s.

In use, the display device 1 forms a left-eye image and a right-eye image, and an observer who positions their head such that their left and right eyes are coincident with the left-eye viewing window 2 and the right-eye viewing window 3 respectively will see a three-dimensional image. The left and right viewing windows 2,3 are formed in a window plane 17 at the desired viewing distance from the display. The window plane is spaced from the plane of the aperture array 13 by a distance $r_o$. The windows 2,3 are contiguous in the window plane and have a pitch e corresponding to the average separation between the two eyes of a human. The half angle to the centre of each window 2, 3 from the normal axis to the display normal is $\alpha_s$.

The pitch of the slits 15 in the parallax barrier 5 is chosen to be close to an integer multiple of the pixel pitch of the SLM 4 so that groups of columns of pixels are associated with a specific slit of the parallax barrier. FIG. 2 shows a display device in which two pixel columns of the SLM 4 are associated with each transmissive slit 15 of the parallax barrier.

In operation, the pixels are driven to display two images that are the left image and right image of a stereoscopic image pair. The images are interlaced on the pixels with, in the display of FIG. 2, alternate columns of pixels being assigned to each image.

A dual view display is similar in principle to the autostereoscopic 3-D display of FIG. 2. However, the pixels are drives to display two independent images intended for display to different observers. Moreover, since the images are intended for display to different observers the pitch e of the two viewing windows is greater in a dual view display than in an autostereoscopic 3-D display—the pitch e is typically of the order of a metre in a dual view display, and of the order of ten cm in an autostereoscopic 3-D display.

A high quality dual view display requires that each user is able to see a high quality, bright image of the desired data content without any interference from the other user's data content. Additionally, each user will require some freedom to move their viewing position again without degradation in image quality and without any interference from the other user's data content. If a user can see interference from the other user's data content then this is typically termed crosstalk or image mixing.

In order to construct a dual view display using a parallax barrier, a set of lines can be drawn from the centre of every odd-numbered pixel column P1,P3 etc to the right view position 3 and another set of lines can be drawn from the centre of every even-numbered pixel column P2,P4 etc to the left view position 2. (This is for a dual view display in which, in use, the left view will be displayed on the even-numbered pixel columns P2,P4 etc. and the right view will be displayed on the odd-numbered pixel columns P1,P3 etc.) At some distance from the plane 18 of the pixels, there are positions 19 where these sets of lines first intersect with one another, and, in a display where the pixels lie in a common plane, the positions of intersection 19 define a line 20, referred to as the "line of intersection", that is spaced from but parallel to the plane 18 of the pixels. In fact, the positions of intersection 19 define a plane that extends into the plane of the paper, parallel to the plane of the pixels. This is shown in FIG. 3(a).

By placing a parallax barrier in the plane 20, such that the opaque regions 22 of the barrier 21 block light everywhere except at the points of intersection 19, as shown in FIG. 3 (b), a dual view display can be created such that the a user in the left view window cannot see the odd-numbered pixel columns and a user in the right view window cannot see the even-numbered pixel columns. In fact if one now draws a set of lines from the edges of each of the pixels, with each line passing though one of the apertures 23 of the parallax barrier 21, it can be shown that such a system naturally has a wide range of positions in which each user can see only the intended pixels—as shown in FIG. 3(b), the left and right view windows 2,3 have a large angular extent. This freedom of movement is one of the requirements for a high quality dual view display. However, in practice having apertures in the form of slits of only infinitesimal width through which light can pass will not provide a useable brightness for the display. In addition, light which passes through narrow apertures will be diffracted, and this light could cause unwanted crosstalk even in positions where geometrically one should not see any crosstalk.

It is possible to increase the brightness of the display by increasing the width of the apertures of the parallax barrier 21, however the increase in brightness is at a cost of reduced viewing freedom. As shown in FIG. 4, increasing the width of the apertures of the parallax barrier leads to a large window 24 between the left view window 2 and the right view window 3 where it is possible to view all of the pixels of the display. An observer positioned in the central region 24 will see both the left image and the right image, and will there fore experience image mixing.

A display having wider apertures in the parallax barrier 21 may again suffer from diffraction effects, which may give crosstalk in positions where geometrically there should not be any crosstalk. Additionally, if the opaque regions of the parallax barrier are made of a material which is not completely absorbing then light from the pixels can leak into the wrong viewing window and add to the unwanted crosstalk.

One known approach to solving these problems is to use a lenticular array (an array of semi-cylindrical lenses) as the parallax optic to provide image separation rather than a parallax barrier. A lenticular array can in principle give good brightness and large observer head freedom without a central image-mixing region. However in practice it may be difficult to achieve this performance for several reasons. The lenses may not be perfectly formed in manufacture, the mechanical stability of the display with thin lenses may suffer, and thermal expansion of the lenses might cause a mismatch in alignment with the pixels.

UK patent application No. 0320358.5 describes a multiple view display in which a prism array is disposed behind a parallax barrier aperture array such that a prism of the array is disposed behind every aperture of the parallax barrier. The prism array alters the angular separation between the left view window and the right view window. However, the angular extent of the central image mixing region is scaled up or down by the same factor as the angular extent of the viewing windows.

UK patent application No. 0501469.1 discloses a dual view display in which the content of data displayed on the pixels of the image display layer is adjusted to compensate for crosstalk between a left image and right image. In one embodiment a faint predetermined masking image is added to the content of the data.

DISCLOSURE OF INVENTION

A first aspect of the present invention provides a multiple view directional display comprising: a pixellated image display layer having a plurality of first pixels assigned to display a first image and a plurality of second pixels assigned to display a second image; and a parallax barrier aperture array for directing light from the first pixels generally into a first viewing window and for directing light from the second pixels generally into a second viewing window not overlapping the first viewing window; wherein the display further comprises first light-directing means for re-directing light emitted from a first lateral edge region of each first pixel away from the second viewing window. Provision of the light-directing means allows the image mixing region seen by an observer to be reduced in angular extent or even completely eliminated, thereby improving the quality of the display.

The first light-directing means may be arranged to direct light emitted from a first lateral edge region of each first pixel into the first viewing window at an intended viewing distance of the display. It may be arranged so as not to re-direct light emitted from a laterally-central region of each first pixel. It may be arranged so as not to re-direct light emitted from a second lateral edge region of each first pixel.

The display may further comprise second light directing means for re-directing light emitted from a first lateral edge region of each second pixel into the second viewing window at an intended viewing distance of the display.

The second light-directing means may be arranged so as not to re-direct light emitted from a laterally-central region of each second pixel. It may be arranged so as not to re-direct light emitted from a second lateral edge region of each second pixel.

The second light directing means may be the first light-directing means.

The first light directing means may comprise an array of lenses, the lens array being non co-planar with the parallax barrier. Each lens of the array may be aligned with a respective aperture of the parallax barrier. Each lens of the array may be substantially co-extensive with a respective aperture of the parallax barrier.

A second aspect of the invention provides a multiple view directional display comprising: a pixellated image display layer having a plurality of first pixels assigned to display a first image and a plurality of second pixels assigned to display a second image; and a parallax barrier aperture array for directing light from the first pixels generally into a first viewing window and for directing light from the second pixels generally into a second viewing window not overlapping the first viewing window; wherein the display further comprises first means for varying a characteristic of light emitted from a first pixel and directed to the second viewing window.

The first means may not substantially vary the characteristic of light emitted from a first pixel and directed to the first viewing window.

The display may further comprise second means for varying a characteristic of light emitted from a second pixel and directed to the first viewing window.

The second means may not substantially vary the characteristic of light emitted from a second pixel and directed to the second viewing window.

The characteristic may be the polarisation and the or each means may be adapted to vary the polarization state of light passing through it.

The or each means may comprise an array of retarders.

Each retarder may be aligned with and is substantially co-extensive with a respective opaque region of the parallax barrier.

Each retarder may be co-extensive with a respective opaque region of the parallax barrier.

Each retarder may be aligned with a respective transmissive region of the parallax barrier.

The characteristic may be the wavelength and the or each means may be adapted to block light of a selected wavelength range.

The or each means may comprise a colour filter barrier array.

Each retarder may be aligned with and is substantially co-extensive with a respective opaque region of the parallax barrier.

The characteristic may be the intensity and the or each means may be adapted to block light of a selected polarisation.

The or each means may comprise an array of linear polarisers.

Each polariser may be aligned with and substantially co-extensive with a respective opaque region of the parallax barrier.

A third aspect of the invention provides a multiple view directional display comprising: a pixellated image display layer having a plurality of first pixels assigned to display a first image into a first viewing window and a plurality of second pixels assigned to display a second image into a second viewing window not overlapping the first viewing window; wherein the pixellated image display layer is non-planar.

The pitch of the pixels of the image display layer may vary over the area of the image display layer.

The width of the pixels of the image display layer may vary over the area of the image display layer thereby to vary the pitch of the pixels.

The width of the pixels assigned to a first image may vary over the area of the image display layer.

The pitch of the pixels of the image display layer may vary such that, for each pair of a first pixel and adjacent second pixel, the distance from the image display layer to the point of intersection of a line from the centre of the first pixel to the centre of the first viewing window and a line from the centre of the second pixel to the centre of the second viewing window is substantially constant over the area of the display.

The pitch of the pixels of the image display layer may be substantially constant over the area of the image display layer.

For each pair of a first pixel and adjacent second pixel, the distance from the image display layer to the point of intersection of a line from the centre of the first pixel to the centre of the first viewing window and a line from the centre of the second pixel to the centre of the second viewing window may vary over the area of the display.

The display may comprise a parallax barrier aperture array for directing light from the first pixels generally into the first viewing window and for directing light from the second pixels generally into the second viewing window, the parallax barrier being positioned generally coincident with a surface defined by the points of intersection.

Each of the parallax barrier apertures may be disposed at a respective one of the points of intersection.

A fourth aspect of the invention provides a multiple view directional display comprising an image display layer, a parallax optic, and a polariser disposed in front of the image display layer; wherein the display further comprises a polarisation-sensitive scattering film disposed over the polariser.

A display of the first, second or third aspect may comprise a polariser disposed in front of the image display layer; wherein the display further comprises a polarisation-sensitive scattering film disposed over the polariser.

The polarisation-sensitive scattering film may not substantially scatter light having a polarisation state passed by the polariser.

The polariser may be a linear polariser.

The image display layer may be a liquid crystal display layer.

The invention also provides an auto stereoscopic display or a dual view display comprising a multiple-view directional display of any of the first to fourth aspects.

BRIEF DESCRIPTION OF DRAWINGS

Preferred embodiments of the present invention will now be de scribed by way of illustrative example with reference to the accompanying figures in which.

BEST MODE FOR CARRYING OUT THE INVENTION

The invention will be described with reference to a dual view display, intended to display a first image to a first observer and a second image to a second observer. However, the invention may also be applied to an autostereoscopic 3-D display.

Figure 4:
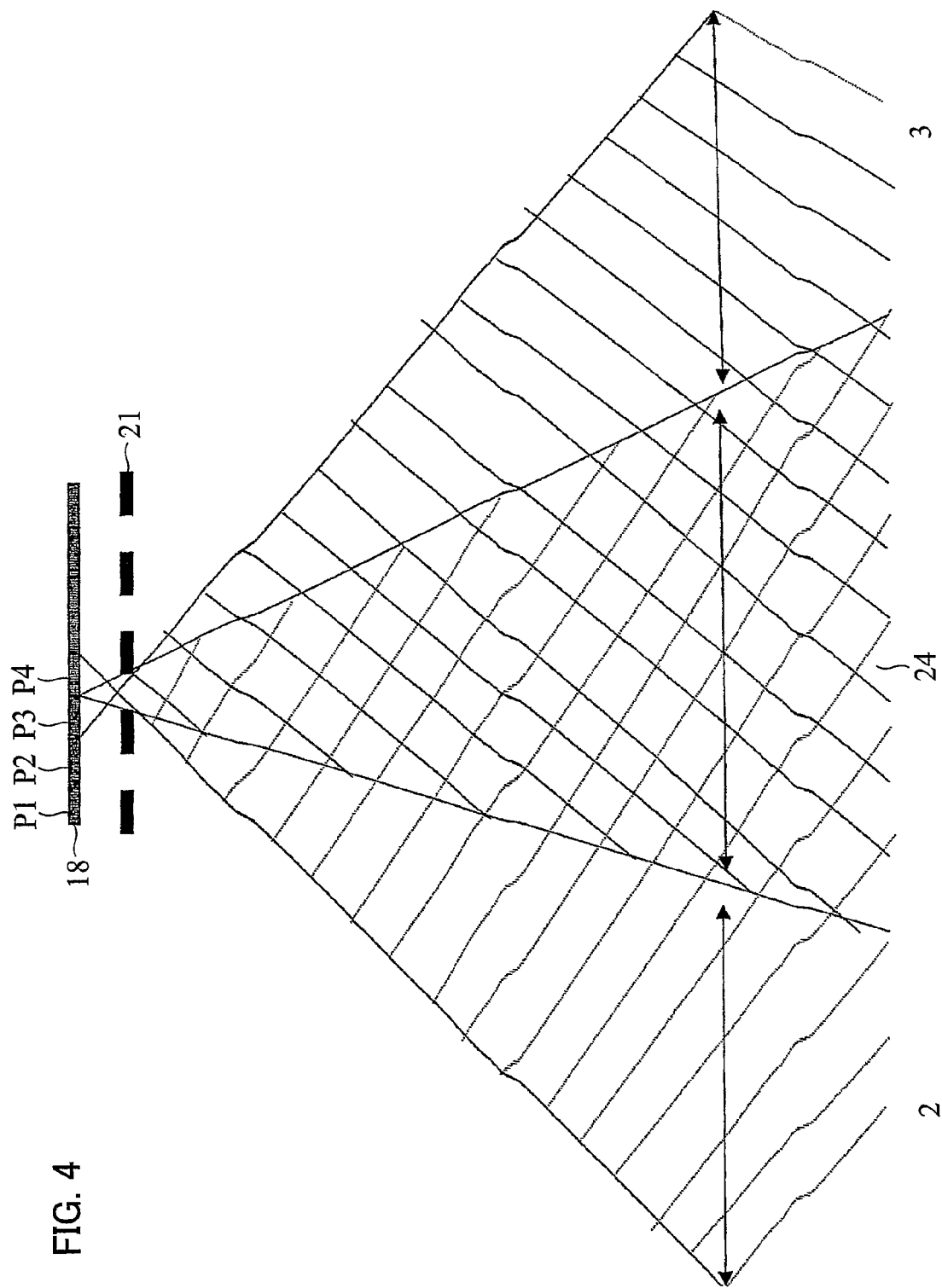
FIG. 4 illustrates the viewing freedom of a multiple view display having a parallax barrier with slits of finite width.
Figure 5:
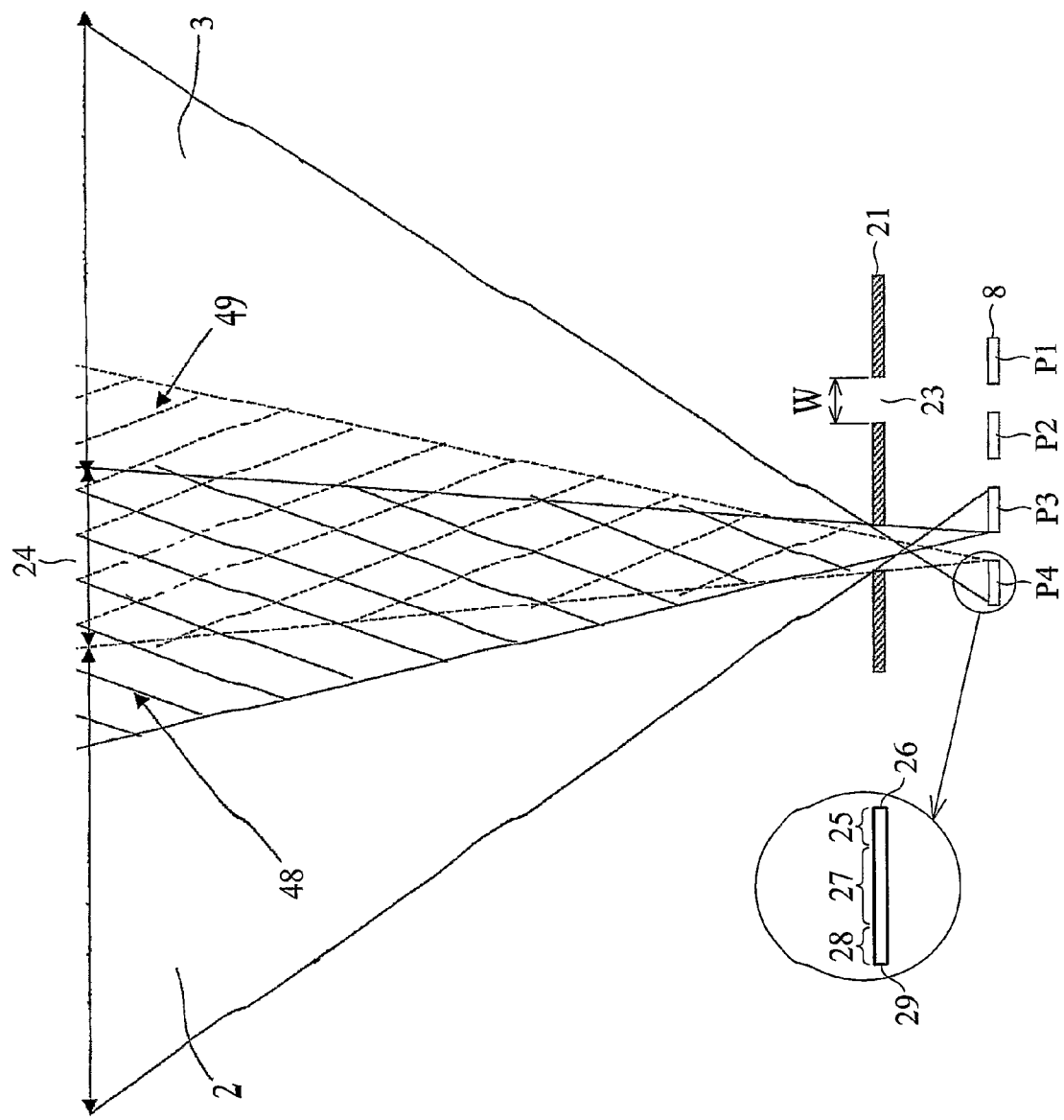
FIG. 5 illustrates the formation of a central image-mixing region.

FIG. 5 shows a dual view display having a pixellated image display layer 8, for example a liquid crystal layer, and a parallax barrier aperture array 21. The pixels are assigned alternately to a "left image" intended for display into a left viewing window 2 and to a "right image" intended for display into a right viewing window 3. Thus, pixels in odd-numbered pixel columns P1, P3 etc are assigned to the left image and so will be referred to as "left pixels" and pixels in even-numbered pixel columns P2, P4 etc are assigned to the right image and so will be referred to as "right pixels". The apertures 23 of the parallax barrier aperture array have a finite width w so that, as explained with reference to FIG. 4 above, a central image mixing region 24 exists.

It can be seen from FIG. 5 that most of the light directed to the image mixing region comes from a region of a pixel along one lateral edge. For example, light from a region 25 of a pixel in pixel column P4 extending along and near one lateral edge 26 is transmitted to the image mixing region 24, as shown by region 49 bounded by broken lines and shaded with broken lines in FIG. 5, whereas the opaque regions 22 of the parallax barrier block light from a laterally-central region 27 of the pixel and light from a region 28 of the pixel near the other lateral edge 29 from entering the image mixing region. Similarly, light from an edge of a left pixel, for example a pixel in pixel column P3, is transmitted to the image mixing region 24, as shown by region 48 bounded by full lines and shaded with full lines in FIG. 5.

Figure 6:
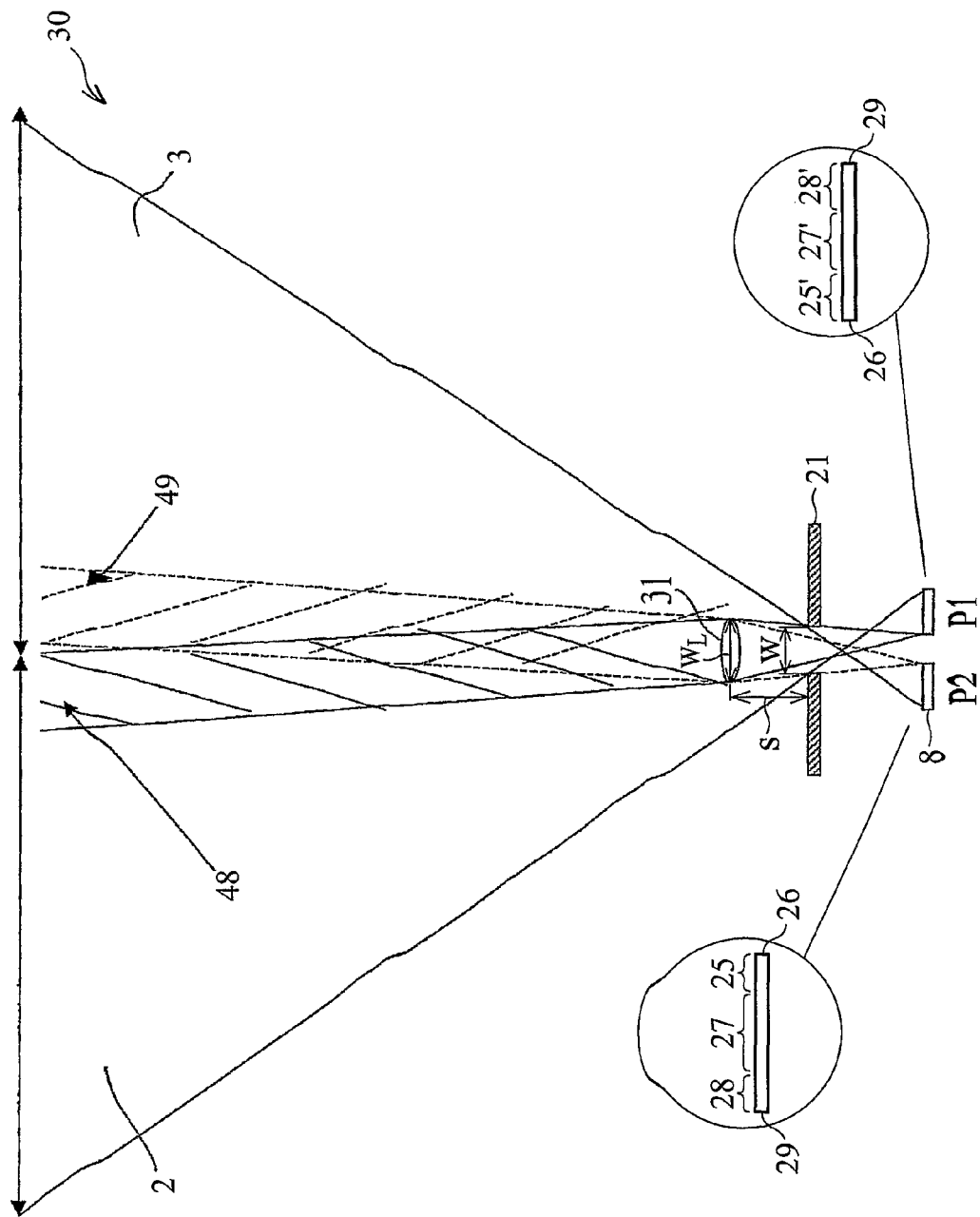
FIG. 6 is a schematic plan view of a display according to a first embodiment of the present invention.

FIG. 6 is a schematic plan view of a dual view display 30 according to a first embodiment of the invention. The display 30 has a pixellated image display layer 8, for example a liquid crystal layer, and a parallax barrier aperture array 21. The pixels are assigned to a "left image" intended for display into a left viewing window 2 and to a "right image" intended for display into a right viewing window 3. FIG. 6 shows a display in which the pixels are arranged in columns that extend into the plane of the paper; FIG. 6 shows the pixels assigned alternately to the left image and the right image so that pixels in odd-numbered pixel columns P1, P3 etc are assigned to the left image and pixels in even-numbered pixel columns P2, P4 etc are assigned to the right image, but the invention is not limited to this particular pixel assignment. The apertures 23 of the parallax barrier aperture array have a finite width w, and have the form of slits whose long axis extends into the plane of the paper. Only two pixel columns and one aperture in the parallax barrier are shown for convenience.

According to the present invention, the display 30 comprises first light directing means for re-directing light emitted from a first lateral edge region 25 of each right pixel away from the left viewing window 2. In the embodiment of FIG. 6, the first light directing means comprises a lens 31. The lens 31 is aligned with the aperture 23 of the parallax barrier, in that a line that forms the intended boundary between the left viewing window 2 and the right viewing window 3 and that passes through the centre of the aperture 23 will also pass through the lens 31, and will preferably pass through the centre of the lens 31. The lens has the form of a prism, that extends into the plane of the paper in FIG. 6 and that has a cross-section as shown in FIG. 6. In general, an array of lens 31 will be provided, with one lens associated with each aperture of the parallax barrier.

As shown in FIG. 6, the lens 31 re-directs light emitted from a first lateral edge region 25 of each right pixel away from the left viewing window 2 so that, at an intended viewing distance from the display, light from the first lateral edge region 25 of each right pixel is directed into the right viewing window 3, as shown by the region 49 defined by, and shaded with, broken lines in FIG. 6.

The lens 31 is preferably positioned such, and is dimensioned such that it does not re-direct light emitted from a laterally-central region 27 or from a second lateral edge region 28 of each right pixel. Light from the laterally-central region 27 or from a second lateral edge region 28 of each right pixel thus passes into the right viewing window as desired. That is, the lens preferably re-directs only light from the right pixel that is directed by the parallax barrier 21 into the left viewing window 2, and the lens preferably has no re-directing effect on light from the right pixel that is directed by the parallax barrier 21 into the right viewing window 3.

The lens 31 is preferably arranged such that it also acts as a second light directing means for re-directing light emitted from a first lateral edge region 25' of each left pixel away from the right viewing window 3. In FIG. 6 the lens 31 is arranged such that re-directs light emitted from a first lateral edge region 25' of each left pixel away from the left viewing window 3 so that, at an intended viewing distance from the display, light from the first lateral edge region 25' of each left pixel is directed into the left viewing window 2, as shown by the region 48 defined by and shaded with full lines in FIG. 6. The lens 31 is again preferably positioned such, and is dimensioned such that it does not re-direct light emitted from a laterally-central region 27' or from a second lateral edge region 28' of each left pixel. Light from the laterally-central region 27' or from a second lateral edge region 28' of each left pixel thus passes into the left viewing window as desired. That is, the lens preferably re-directs only light from the left pixel that is directed by the parallax barrier 21 into the right viewing window 3, and the lens preferably has no re-directing effect on light from the left pixel that is directed by the parallax barrier 21 into the left viewing window 2.

In principle, separate means could be provided for redirecting light from the edge region 25 of a right pixel and for redirecting light from the edge region 25' of a left pixel.

In FIG. 6 the lens 31 is positioned in front of the parallax barrier 21, and has a width $w_L$ that is slightly greater than the width w of the aperture 23 of the parallax barrier. The width $w_L$ of the lens is such that the lens is just wide enough to split the light from the edges of the pixels so that the lens therefore will not interfere with the light coming from the centre of the pixels. The effect is to redirect light that is directed into the central image mixing region 24 of FIG. 5 into the left and right viewing windows 2 and 3. The central image mixing region of FIG. 5 is therefore eliminated, and the angular extent of the left and right viewing windows is increased.

The separations between the parallax barrier and the lens 31, the width $w_L$ of the lens 31, and the magnifying power of the lens may be chosen for a particular display based on the dimensions of the display components and on the intended viewing distance of the display so as to give the greatest possible reduction of the central image mixing region 24 of FIG. 5 without interfering with the image splitting by the parallax barrier.

For example, for a slit width of w, a separation of x between a plane containing the barrier slits and a plane containing the pixels, and a black mask width (between adjacent pixels) of b, the separation d between the plane containing the pixels and a plane containing the lenses is given by:

$$d=3x$$

The focal length of the lenses is given by:

$$f=3x+a$$

Where $a=xb/(w-b)$, and the width $w_L$ of each lens is given by:

$$w_L=(2w(3x+a))/(2(x+a)).$$

FIG. 7(a) shows further mechanisms that can lead to image mixing in a dual view display.

FIG. 7(a) is a plan view of a display in which the pixels emit polarised light, with the polarisation direction encoding the desired pixel brightness. The polarisation direction is "decoded" or analysed by an output polariser 32 so that the desired pixel brightness is output by the display. In the following description, a left pixel PL is controlled to be at full brightness whereas a right pixel PR is controlled so as to be maximally dark or "black". Thus, light emitted by the right pixel PR has an orthogonal polarisation state to light emitted by the left pixel PL. Light from the pixels is directed into left and right viewing windows 2,3 by a parallax barrier aperture array 21. The output polariser 32 is provided in front of the parallax barrier 21.

FIG. 7(a) shows several paths that light might take from a pixel through the parallax barrier 21 and into the viewing windows. In this example as described above, the left pixel PL has an output polarization state that is linearly polarised into the page so as to display "white" while the right pixel PR has an output polarization state that is linearly polarised-parallel to the page so as to display "black". With the output polariser 32 comprising a linear polariser with its transmission axis perpendicular to the page, the display displays the left pixel as white and the right pixel as black.

The desired path of the light from a pixel PR,PL is through an aperture in the parallax barrier 21 and a majority of the light will take this path. However in the case of the right viewing window 3, some of the light arriving may have been emitted by the left pixel PL and have been diffracted at the aperture 23 in the parallax barrier, as shown by ray path 50 in FIG. 7(a). In addition some of the light from the left pixel PL might leak through the barrier 21 into the right viewing window 3, as shown by ray path 51, if the opaque regions 22 of the parallax barrier are not completely opaque. This undesired light from the left pixel PL is plane-polarised into the page, and so will be able to pass through the exit polariser 32 and add unwanted light to the right viewing window. If, in another part of the display, another left pixel emits light that is linearly-polarised parallel to the page, so as to appear black, then any undesired light leaking from this other left pixel would not pass through the exit polariser 32, since the polariser has its transmission axis parallel to the page, and so could not add unwanted light to the display. This leads to the problem that the left pixels are "leaking" light in some regions of the display but not in other regions, which results in a visible pattern of light and dark regions which forms a spurious image with a significant contrast ratio.

Similarly, light arriving in the left viewing window 2 may contain light from a right pixel, for example light that has traveled along a diffraction light path 50' and/or light that has traveled along a leakage light path 51'.

According to another aspect of the invention, therefore, a multiple view directional display of the invention is provided with means for varying a characteristic of light emitted from a pixel and directed to an incorrect viewing window (so, in the case of a dual view display for example, for varying a characteristic of light emitted from a left (right) pixel and directed to a right (left) viewing window). The characteristic of the light may be, for example, one of polarisation, wavelength or intensity.

FIG. 7(b) is a schematic sectional plan view of a dual view display 33 according to this aspect of the invention. The display 33 has a pixellated image display layer 8, for example a liquid crystal display layer, and a parallax barrier aperture array 21. The pixels are assigned to a "left image" intended for display into a left viewing window 2 and to a "right image" intended for display into a right viewing window 3. FIG. 7(b) shows a display in which the pixels are arranged in columns that extend into the plane of the paper; in the figure the pixels are assigned alternately to the left image and the right image, but the invention is not limited to this particular pixel assignment. The apertures 23 of the parallax barrier aperture array have a finite width, and have the form of slits whose long axis extends into the plane of the paper. Only two pixel columns and one aperture in the parallax barrier are shown for convenience. The left pixel PL is shown as emitting light that is linearly polarised into the page so as to appear white while the right pixel PR emits light that is linearly polarised parallel to the page so as to appear black. A linear polariser with its transmission axis oriented perpendicular to the page is disposed in front of the parallax barrier as an output polariser 32.

The display 33 is provided with means for varying the polarisation of light emitted by a left pixel PL but directed to the right viewing window 3. In FIG. 7(b) retarders 34 are placed over each opaque region 22 of the parallax barrier 2L. In this embodiment each retarder is generally co-extensive with, but is slightly wider than, the respective opaque region 22 of the parallax barrier 21, so that light that is diffracted around the edge of the opaque region 22 of the parallax barrier will pass through the retarder; light leaking through the opaque regions of the parallax barrier will also pass through the retarder 34. In this case the polarisation state of light from the left pixel PL that is directed to the right viewing window 3, either by diffraction around the opaque region 22 of the barrier or by leakage through the opaque region 22 of the barrier, is changed as a result of passing through the retarder 34.

Each retarder 34 is preferably a quarter-wave plate. Thus, when light from the left pixel PL passes through a retarder 34 its polarisation state changes from linear polarisation into the page to right-handed circular polarisation. The output polariser 32 will partially transmit and partially block the right-handed circular polarisation state, so that 50% of the light from the left pixel but directed into the right view window 3 will be passed by the exit polariser 32 so that there will still be unwanted light in the right view. However, if in another part of the display the light from another left pixel is linearly polarised parallel to the page so as to appear black, then any light from this other left pixel that is directed into the right viewing window would have its polarisation state changed to left handed circular polarisation upon passing through a quarter-wave plate, and the output polariser 32 will again partially transmit and partially block the left-handed circular polarisation state. Thus, 50% of light from the other left pixel will again be passed by the output polariser 32 into the right viewing window. (In fact, 50% of light of any linear polarisation state emitted by a left pixel will be passed by the exit polariser if it has passed through the quarter wave plate.) This means that, although unwanted light is reaching the right view window from the left pixels, every left pixel is contributing approximately the same intensity to the right view window. The light from the left pixels entering the right viewing window will have no significant intensity variation over the area of the display and therefore will not result in a visible pattern of light and dark regions.

The retarders 34 are slightly wider than the respective opaque regions 22 of the parallax barrier, so that much of the width of the aperture 23 of the parallax barrier is not covered by the retarder. Thus, almost all of the light emitted by the left pixel PL and correctly directed to the left viewing window 2 by the parallax barrier does not pass through the retarder 34, and so does not have its polarisation state changed.

The retarders 34 also act as a means for changing the polarisation state of light emitted by a right pixel PR but directed into the left viewing window 2. As is shown in FIG. 7(b), light emitted by the right pixel PR and that either leaks through the opaque region 22 of the parallax barrier, or that is diffracted around the edge of the barrier aperture, and so is directed to the left viewing window 2, passes through a retarder 34. However, almost all of the light emitted by the right pixel PR and correctly directed to the right viewing window 3 by the parallax barrier does not pass through the retarder 34, and so does not have its polarisation state changed.

The display 33 of FIG. 7(b) may be modified such that the retarders 34 have the same width as, and are aligned with, the opaque regions 22 of the parallax barrier, as shown in display 35 of FIG. 7(c). Apart from this, the display 35 of FIG. 7(c) corresponds generally to the display 33 of FIG. 7(b), and the description of features common to both displays will not be repeated. This embodiment may be used where the dominant source of cross-talk is leakage of light through the opaque regions 22 of the parallax barrier, and light leakage from diffraction of light around the opaque regions of the barrier can be neglected compared to this.

FIG. 7(d) shows a further display 36 of the invention. The display 36 corresponds generally to the display 33 of FIG. 7(b), and only the differences will be described.

In the display 36 of FIG. 7(d) the retarders 34 are arranged such that only light diffracted around the edge of an opaque region 22 of the parallax barrier passes through a retarder; light that leaks through an opaque region 22 of the parallax barrier does not pass through a retarder. This may be achieved, as shown in FIG. 7(d), by placing the retarders 34 in the apertures 23 of the parallax barrier, along the edges of the apertures 23. This embodiment may be used where the dominant source of cross-talk is diffraction of light around the opaque regions of the barrier and the leakage of light through the opaque regions 22 of the parallax barrier can be neglected compared to this.

In the display 36 of FIG. 7(d), the retarders 34 are preferably quarter-wave plates, and this embodiment thus operates as described with reference to FIG. 7(b) above.

It may also be possible to balance the intensity of light diffracted around the barrier and the intensity of light that leaks through the barrier so that on average the same proportion of unwanted light passes through the exit polariser independent of the polarization state of the light as emitted by the pixels. For example, in the display 35 of FIG. 7(c) light that leaks through an opaque region of the parallax barrier has its plane of polarisation rotated by 90° by the retarders 34, which are half wave plates in this embodiment, but light that is diffracted around the edge of an opaque region 22 of the barrier 21 has its polarisation state unchanged. If the amount of light leaking through the opaque regions 22 of the barrier is tuned (for example by reducing the thickness of the opaque regions 22) so that it is made equal to the intensity of the diffracted light then, on average, the same amount of light from the left (right) pixel will pass through the exit polariser into the right (left) viewing window, independent of the polarization state of light emitted by the pixel.

Figure 7:
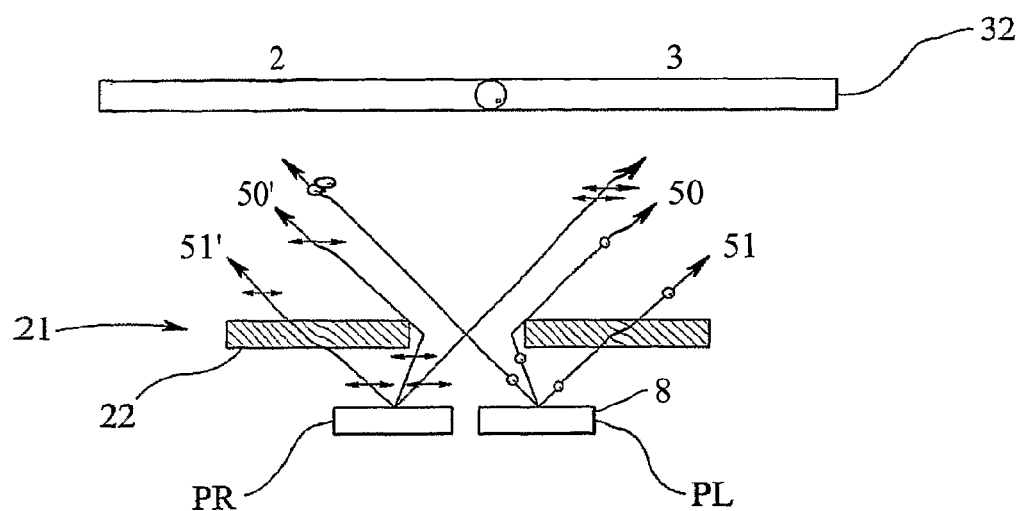
FIG. 7(a) further illustrates image mixing in a multiple view directional display.
FIGS. 7(b) to 7(d) are schematic plan views of displays according to further embodiments of the present invention.
FIG. 7(e) is a schematic front view of a displays according to a further embodiments of the present invention.
Figure 7:
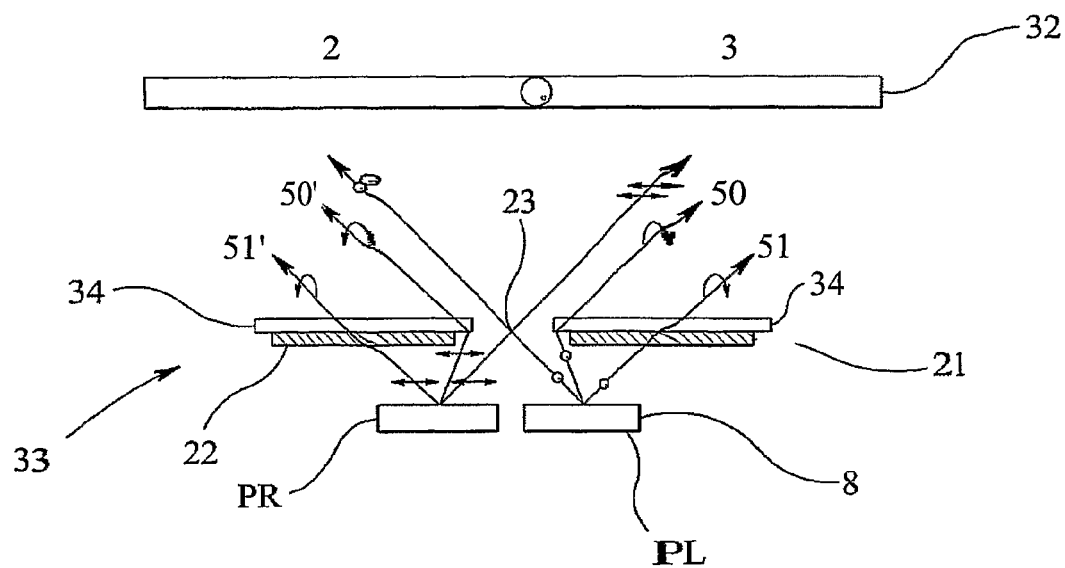
Figure 7:
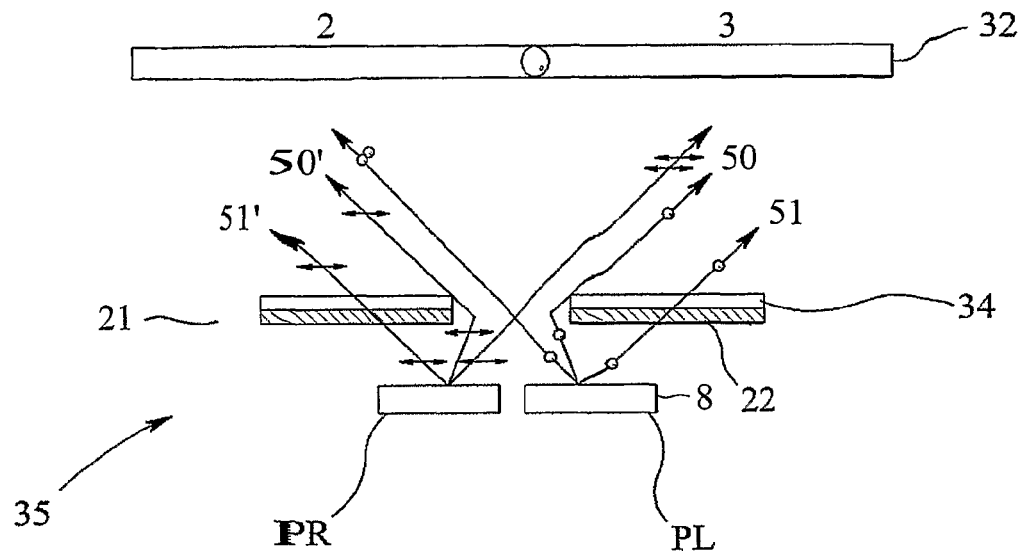
Figure 7:
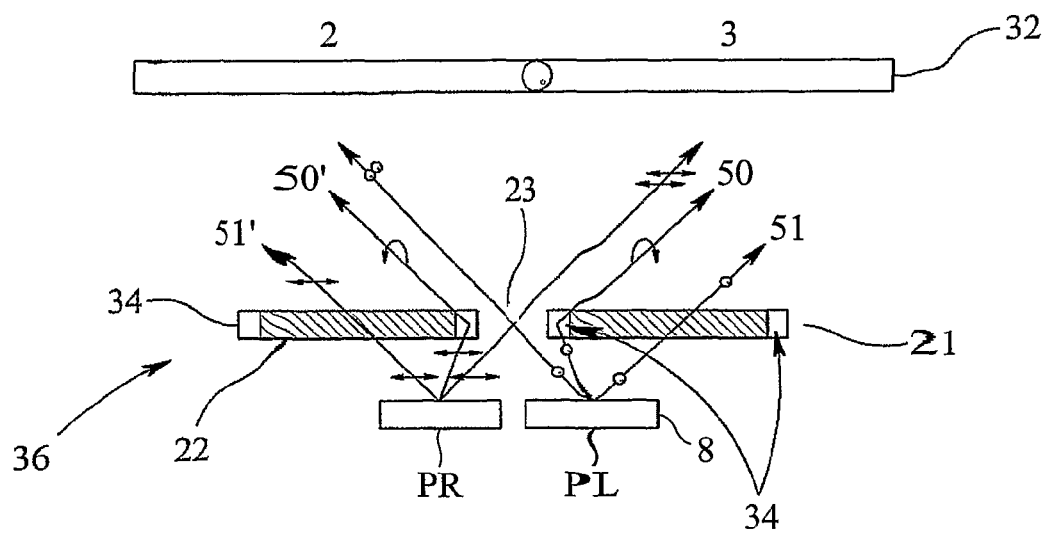
Figure 7:
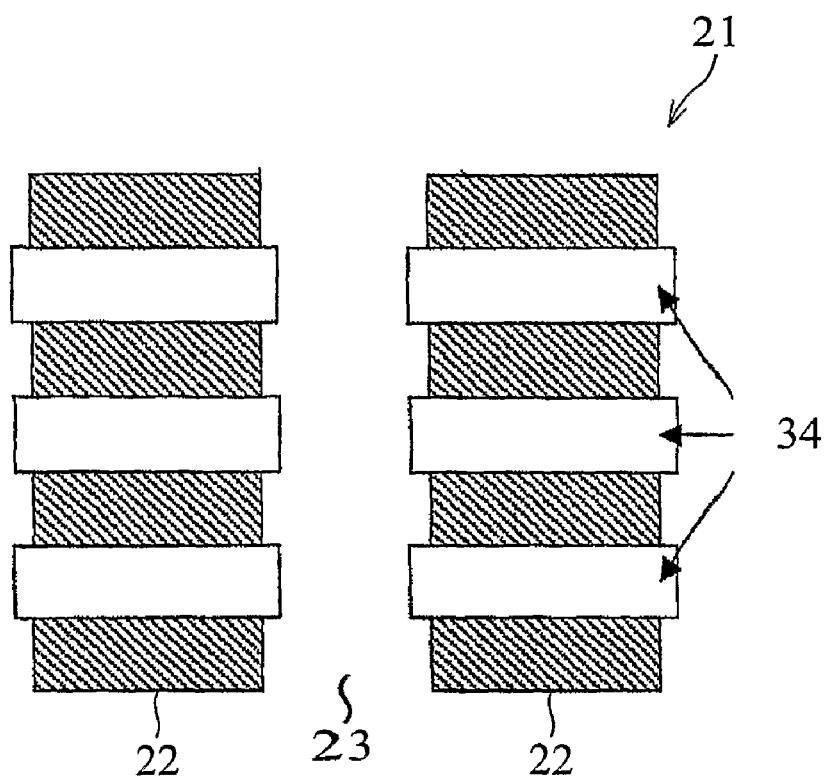

If it should not be possible to balance the intensity of light diffracted around the barrier with the intensity of light leaking through the opaque regions 22 of the barrier accurately enough or at all viewing angles, it may be possible to balance the cross-talk spatially by patterning the retarders 34 along the length of the barrier black region. The front view of a parallax barrier 21 with such a patterned retarder is shown in FIG. 7(*e*). Retarders 34 partially cover each opaque region 22 of the barrier 21, but parts of the opaque region 22 are not covered by the retarders. In this case any light that leaks through the opaque regions of the barrier will have its polarisation state charged if it passes through a retarder or will have its polarisation unchanged if it passes through the opaque region of the barrier at a point where no retarder is present. This spatial averaging of the intensity of light leaking into the incorrect viewing window will result in no visible image contrast and should be independent of the angle of view.

A similar effect on the diffracted light will be obtained if the waveplate extends just beyond the barrier black area, as actually illustrated in FIG. 7(*e*).

The retarders 34 are shown as separate retarders in FIGS. 7(*b*) to 7(*e*). However, the retarders may be embodied as a single patterned retarder which has non-zero retardation in regions corresponding to the retarders 34 shown in FIGS. 7(*b*) to 7(*e*) and has zero effective retardation elsewhere.

Figure 8:
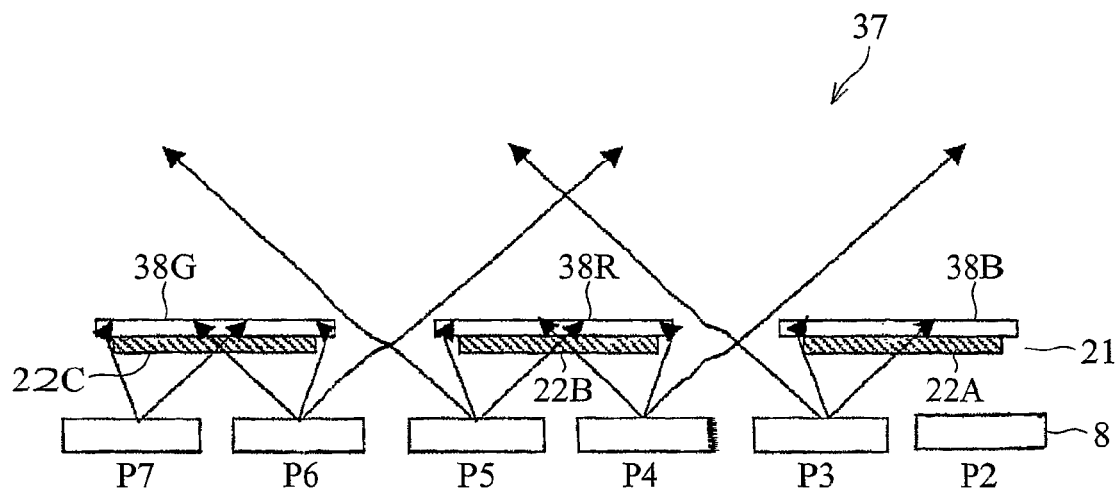
FIG. 8 is a schematic plan view of a display according to a further embodiment of the present invention.

In a further embodiment of the invention, a multiple view display has means for blocking light of a selected wavelength that has been directed to an incorrect viewing window. FIG. 8 is a schematic plan sectional view of a display 37 according to this embodiment of the invention.

The display 37 has a pixellated image display layer 8, for example a liquid crystal display layer, and a parallax barrier aperture array 21. The pixels are assigned to a "left image" intended for display into a left viewing window 2 and to a "right image" intended for display into a right viewing window 3. FIG. 8 shows a display in which the pixels are arranged in columns that extend into the plane of the paper; FIG. 8 shows the pixels assigned alternately to the left image and the right image so that pixels in odd-numbered pixel columns P1, P3 etc are assigned to the left image and pixels in even-numbered pixel columns P2, P4 etc are assigned to the right image. The pixels are colour pixels and emit, in this embodiment, either red, green or blue light. Thus, pixels in pixel column P2 are right pixels that emit green light, pixels in pixel column P3 are left pixels that emit red light, pixels in pixel column P4 are right pixels that emit blue light, pixels in pixel column P5 are left pixels that emit green light, pixels in pixel column P6 are right pixels that emit red light and pixels in pixel column P7 are left pixels that emit blue light but the invention is not limited to this particular pixel assignment. The apertures 23 of the parallax barrier aperture array have a finite width, and have the form of slits whose long axis extends into the plane of the paper.

In FIG. 8 colour filters 38B, 38G, 38R are placed over each opaque region 22 of the parallax barrier 21. In this embodiment each colour filter is generally co-extensive with, but is slightly wider than, the respective opaque region 22 of the parallax barrier 21, so that light that is diffracted around the edge of the opaque region 22 of the parallax barrier will pass through the colour filter; light leaking through an opaque region of the parallax barrier will also pass through the respective colour filter. The colour filter transmit light of a selected wavelength range, so that colour filter 38G transmits green light and blocks red and blue light, colour filter 38R transmits red light and blocks green and blue light, and colour filter 38B transmits blue light and blocks green and red light. As is shown in FIG. 8, the colour filters are arranged such that light of one colour that leaks through an opaque region 22A, 22B, 22C of the parallax barrier or that is diffracted around the edge of the opaque region of the barrier is incident on a colour filter that blocks light of that colour. The light is thus prevented from entering the incorrect viewing window.

As an example, opaque region 22C of the parallax barrier is located over a left blue pixel column P7 and a right red pixel column P6. A colour filter 38G that transmits green light and blocks red and blue light is disposed over the opaque region 22C of the parallax barrier. As a result, any blue light from the left blue pixel column P7 that leaks through the opaque region 22C of the barrier or that is diffracted around the edge of the opaque region 22C is blocked by the green colour filter 38G and so does not reach the right viewing window. Any red light from the right red pixel column P6 that leaks through the opaque region 22C of the barrier or that is diffracted around the edge of the opaque region 22C is blocked by the green colour filter 38G and so does not reach the left viewing window.

Similarly, a colour filter 38R that transmits only red light is provided over opaque region 22B of the parallax barrier, which is located over a left green pixel column P5 and a right blue pixel column P4, and a colour filter 38B that transmits only blue light is provided over opaque region 22A of the parallax barrier, which is located over a left red pixel column P3 and a right green pixel column P2.

The colour filters 38B, 38G, 38R are slightly wider than the respective opaque regions 22A, 22B, 22C of the parallax barrier, so that much of the width of the aperture 23 of the parallax barrier is not covered by the colour filters. Furthermore, the colour filters are preferably arranged so that if a colour filter should cross the path of light from a pixel to the intended viewing window for light from that pixel, the colour filter will transmit that light. Thus, as an example, if the colour filter 38B should cross the path of light from the right pixels in column P4 to the right viewing window, this will not matter since the pixels in column P4 emit blue light which is passed by the colour filter 38B. Thus, an advantage of using colour filters instead of increasing the amount of absorbing black mask (for example to reduce the barrier slit width and/or the lateral extent of the pixels) is that the colour filters can extend into the apertures 23 of the parallax barrier region without greatly affecting the brightness of the display but still have a significant effect on the diffracted light.

Figure 9:
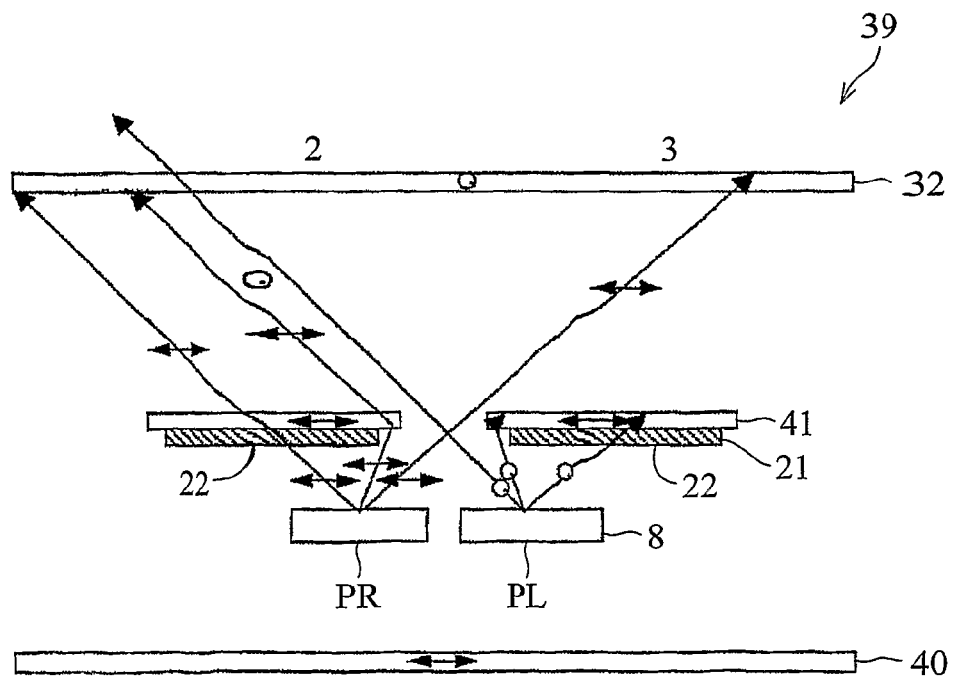
FIG. 9 is a schematic plan view of a display according to a further embodiment of the present invention.

In a further embodiment of the invention, a multiple view display has means for blocking light of a selected polarisation that has been directed to an incorrect viewing window. FIG. 9 is a schematic plan sectional view of a display 39 according to this embodiment of the invention. The display 39 of FIG. 9 corresponds generally to the display 33 of FIG. 7(*b*), and only the differences will be described.

In FIG. 9 polarisers 41 are placed over each opaque region 22 of the parallax barrier 21. In this embodiment each polariser is generally co-extensive with, but is slightly wider than, the respective opaque region 22 of the parallax barrier 21, so that light that is diffracted around the edge of the opaque region 22 of the parallax barrier will pass through the polarizer; light leaking through the opaque regions 22 of the parallax barrier will also pass through the polariser 34. The polarisers 41 are linear polarisers, and each polariser is arranged with its transmission axis substantially perpendicular to the transmission axis of the output polariser 32. In the example of FIG. 9, the left pixel PL has an output polarization state that is linearly polarised into the page while the right pixel has an output polarization state that is linearly polarised parallel to the page. The output polariser 32 is a linear polariser with its transmission axis perpendicular to the page, and the polarisers 41 have their transmission axes parallel to the plane of the paper. Thus, the intensity of light from a left pixel PL that that is directed to the right viewing window 3, either by diffraction around the opaque region 22 of the barrier or by leakage through the opaque region 22 of the barrier, is changed by the polariser 41—the polariser 41 blocks light from a left pixel that has been diffracted around the opaque region 22 of the barrier or has passed through the opaque region 22 of the barrier, and prevents such light from reaching the right view window.

FIG. 9 also shows an input polariser 40 of the LCD, which may also be present in the other LCDs shown in the other drawings.

Light from the right pixel PR which has been diffracted around the opaque region 22 of the barrier or has passed through the opaque region 22 of the barrier is passed by the polariser 41, since the polariser 41 is arranged with its transmission axis parallel to the polarisation direction of light from the right pixel. However, this light is absorbed by the exit polariser 32, and so does not reach an observer. Thus, by ensuring the additional polarisers 41 have their transmission axis perpendicular to the transmission axis of the exit polariser it is possible to ensure that all light directed towards an incorrect viewing window is absorbed before it can leave the display.

In FIG. 9 the additional polarisers 41 are slightly wider than the respective opaque regions 22 of the parallax barrier. Thus, almost all of the light emitted by the left pixel PL and correctly directed to the left viewing window 2 by the parallax barrier does not pass through the additional polarisers 41, and so is not blocked by the additional polarisers 41.

The additional polarisers 41 are shown as separate polarisers in FIG. 9. However, the polarisers may be embodied as a single patterned polariser which is a linear polariser in regions corresponding to the polarisers 41 shown in FIG. 9 and is non-polarising elsewhere.

In FIGS. 8 and 9 the colour filters 38R, 38G, 38B and additional polarisers 41 are shown as slightly wider than the respective opaque regions 22 of the parallax barrier, so that light which has been diffracted around the opaque region 22 of the barrier or has passed through the opaque region 22 of the barrier will pass through the colour filter or polariser. If the predominant cause of cross-talk is light leakage through the barrier it would alternatively be possible to make the colour filters 38R, 38G, 38B or additional polarisers 41 equal in width to the width of the opaque regions 22 of the parallax barrier, in the same way as for the retarders of FIG. 7(c). Conversely, if the predominant cause of cross-talk is diffraction of light around the barrier it would alternatively be possible to provide the colour filters 38R, 38G, 38B or additional polarisers 41 only along edge regions of the apertures of the parallax barrier, in the same way as for the retarders of FIG. 7(d).

Figure 10:
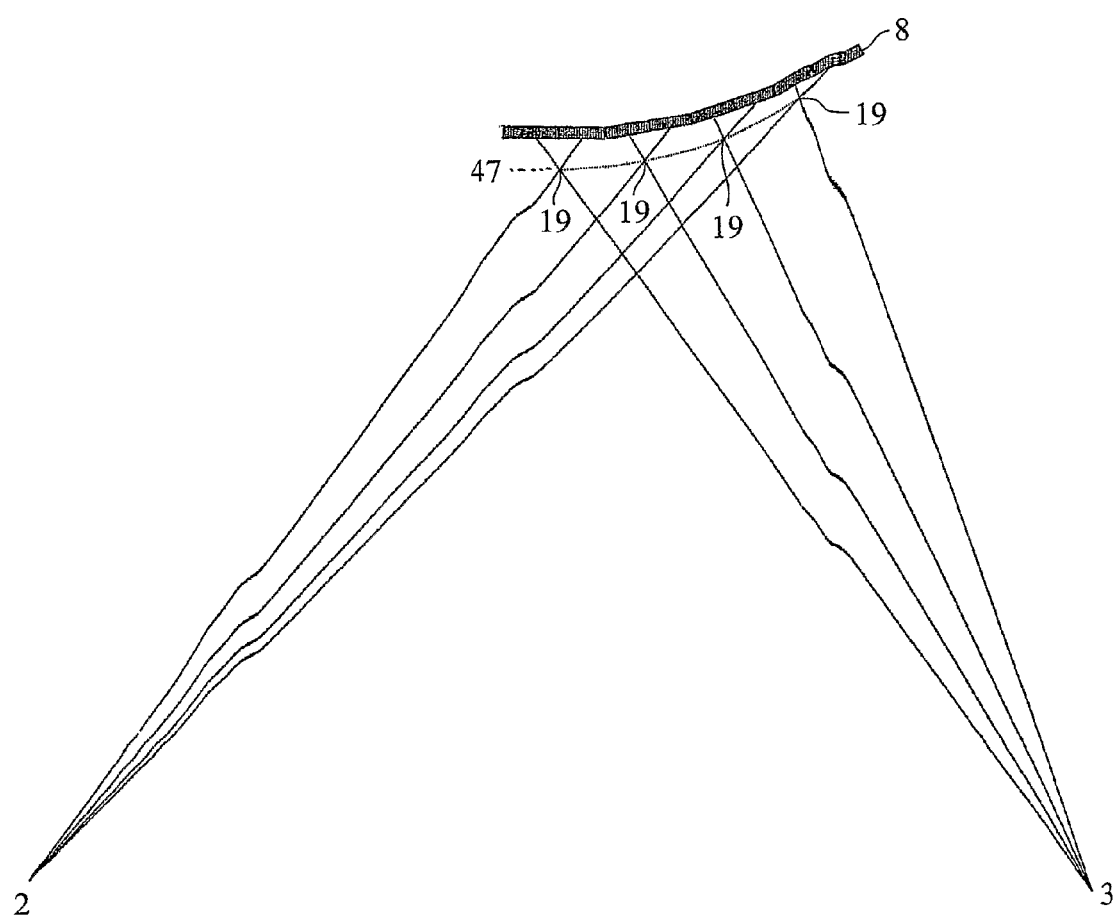
FIG. 10 is a schematic illustration of a multiple view directional display having a curved image display layer.

In the future it is expected that displays will be flexible and that, for example, displays for use in a motor vehicle might be moulded into the dashboard of the vehicle, which is almost always curved. When constructing a multiple view directional display that is curved it is important to make changes to the barrier and/or pixel design to ensure good image quality, low cross-talk and wide viewing free dom. FIG. 10 shows a display having a curved, pixellated image display layer 8 and two arbitrary viewing positions, for example a left viewing position 2 and a right viewing position 3. Again FIG. 10 shows lines drawn lines from the centres of left (or right) pixels to the left (or right) positions—as explained with reference to FIG. 3(a) above, the points of intersection 19 define the ideal position for a parallax barrier.

Figure 1:
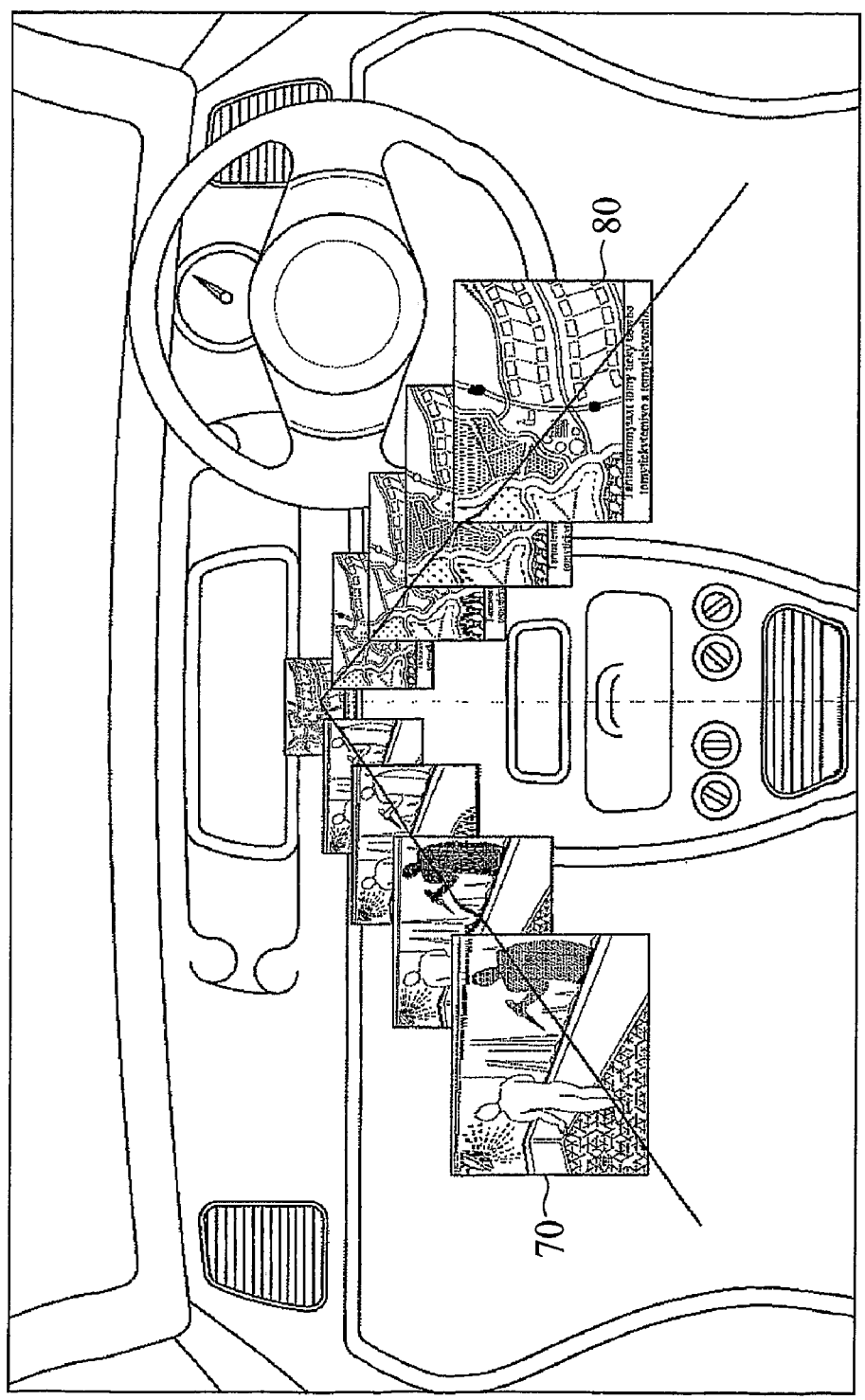
FIG. 1 is a schematic illustration of a dual view display in use in a motor vehicle.
Figure 2:
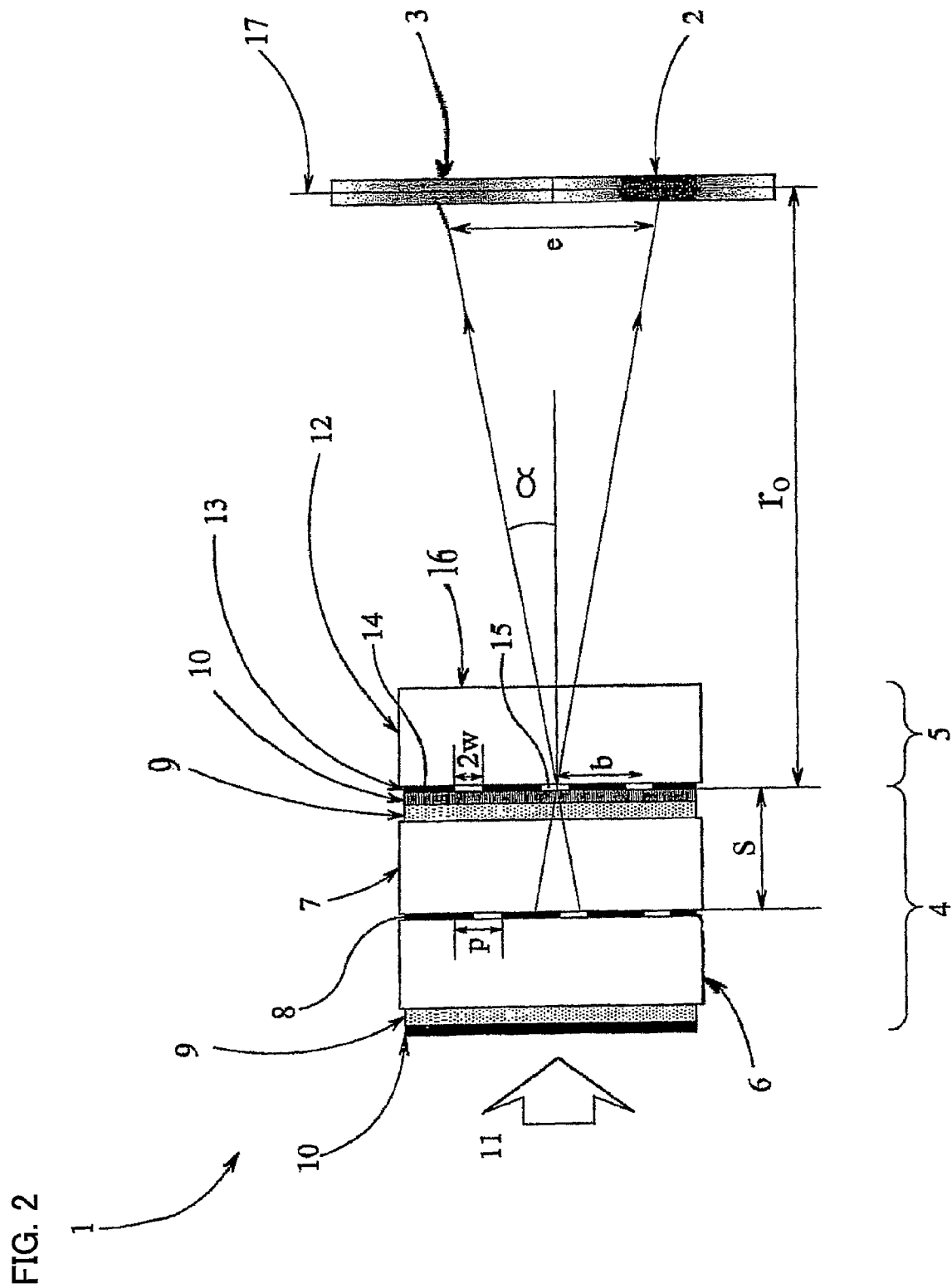
FIG. 2 is a schematic plan sectional view of a multiple view directional display.
Figure 3:
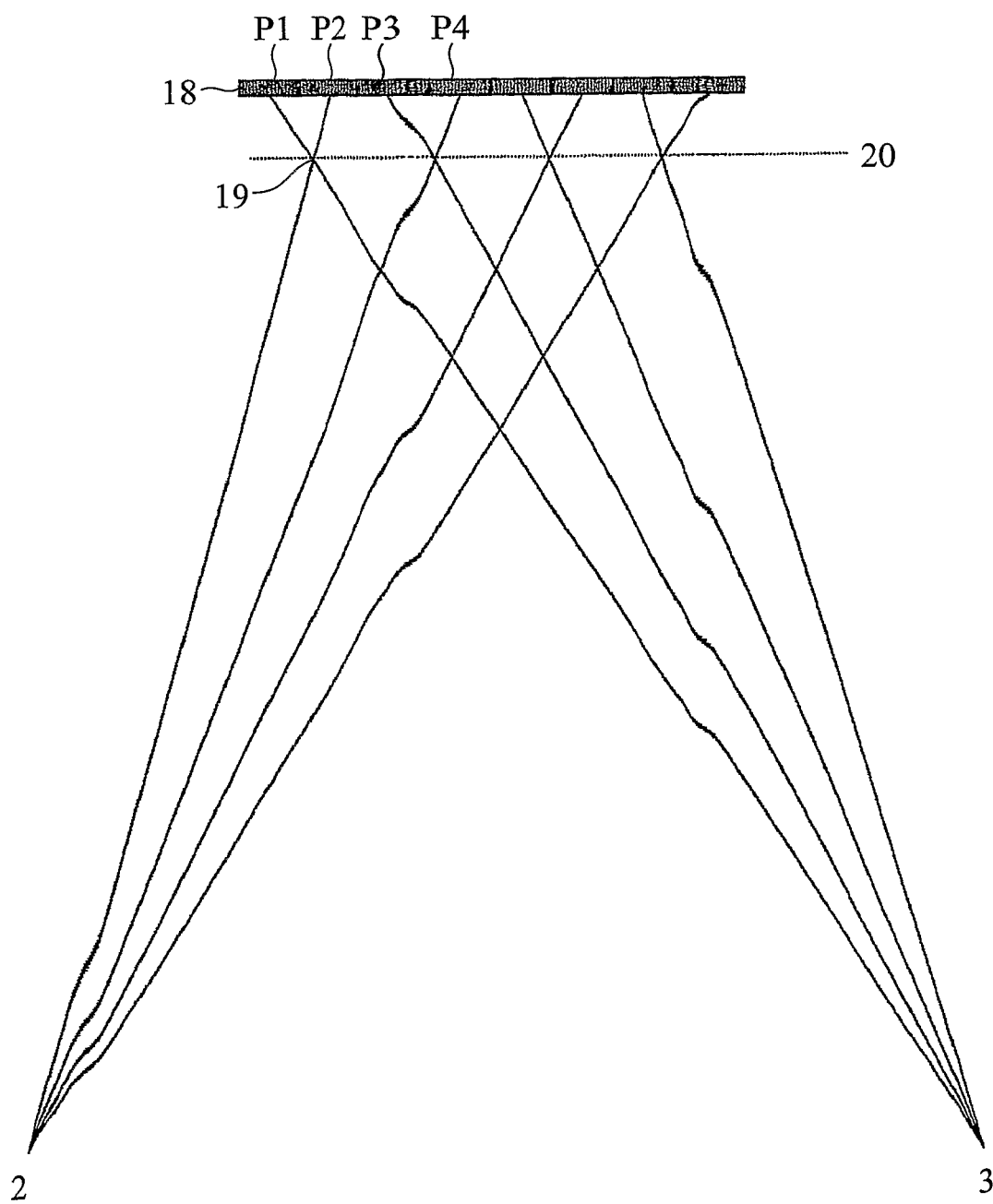
FIG. 3(a) illustrates determining the position of the parallax barrier slits for a multiple view display.
FIG. 3(b) illustrates the viewing freedom of a multiple view display having a parallax barrier with infinitesimally narrow slits.
Figure 3:
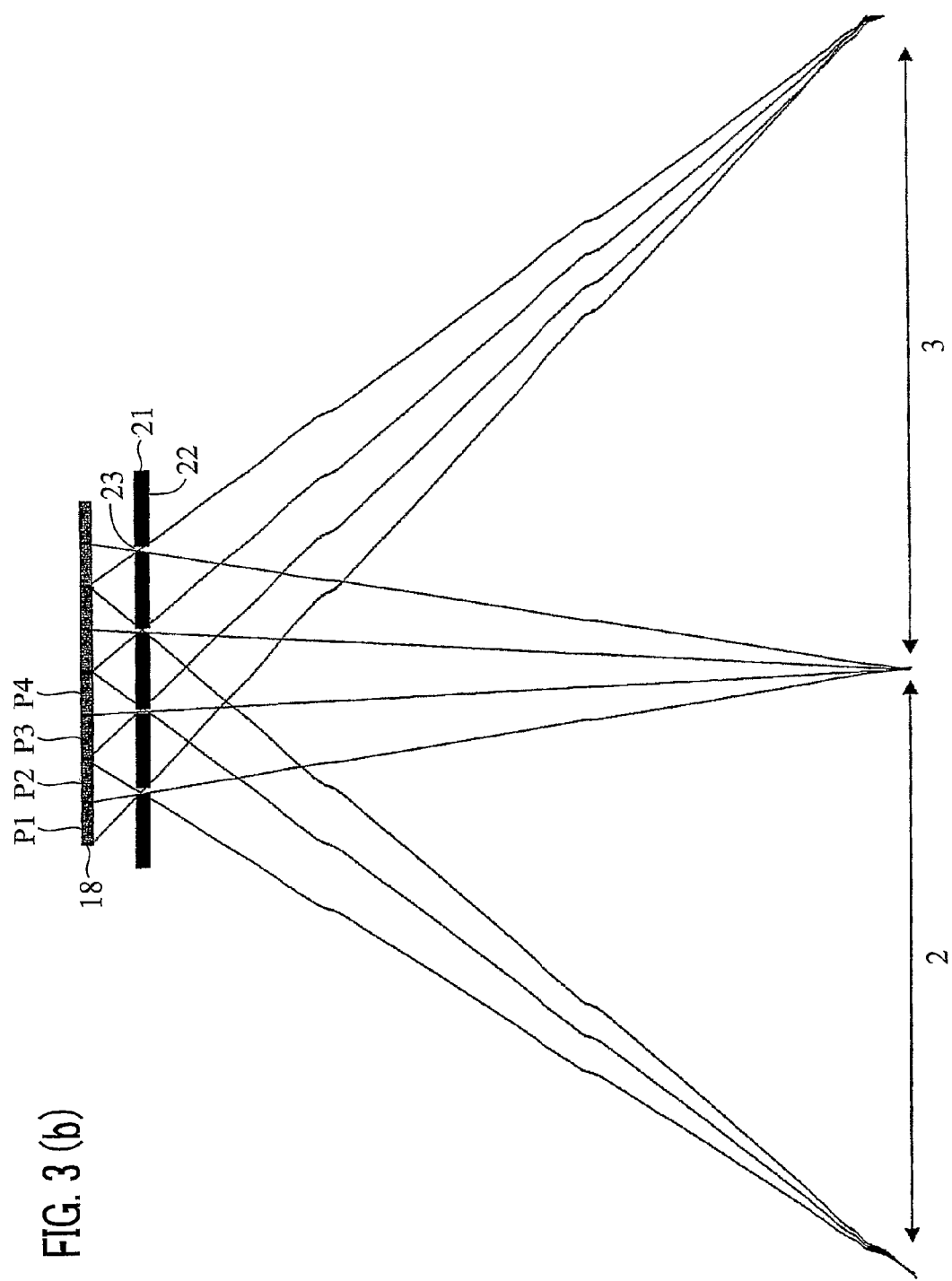

In the display of FIG. 10, however, the points of intersection 19 lie on a curve 47 (or, to be precise, on a curved surface that extends into the paper) rather than on a straight line. Moreover, it is important to note that this curve 47 is not at a constant distance from the pixels of the display. The separation between the curve 47 and the image display layer, measured perpendicular to the instantaneous plane of the image display layer, decreases moving to the right in FIG. 10. Therefore simply constructing a dual view display as before, for example as shown in FIG. 3(b) or 4 with the parallax barrier at a constant separation from the image display layer, and allowing it to be bent to suit a particular installation will not result in cross-talk free viewing over a wide viewing range. In order to obtain a high quality display it would be necessary to vary the thickness of the gap between the image display layer and the barrier to achieve optimal cross-talk free, wide viewing freedom.

If it is not desirable to have a gap between the pixels and the parallax barrier that varies over the area of the display, for example because of difficulties in manufacturing such a display, then an alternative approach is to make the spacing between the pixels and the parallax barrier constant over the area of the display. This may be done by changing the pitch of the pixels, as shown in FIG. 11.

Figure 11:
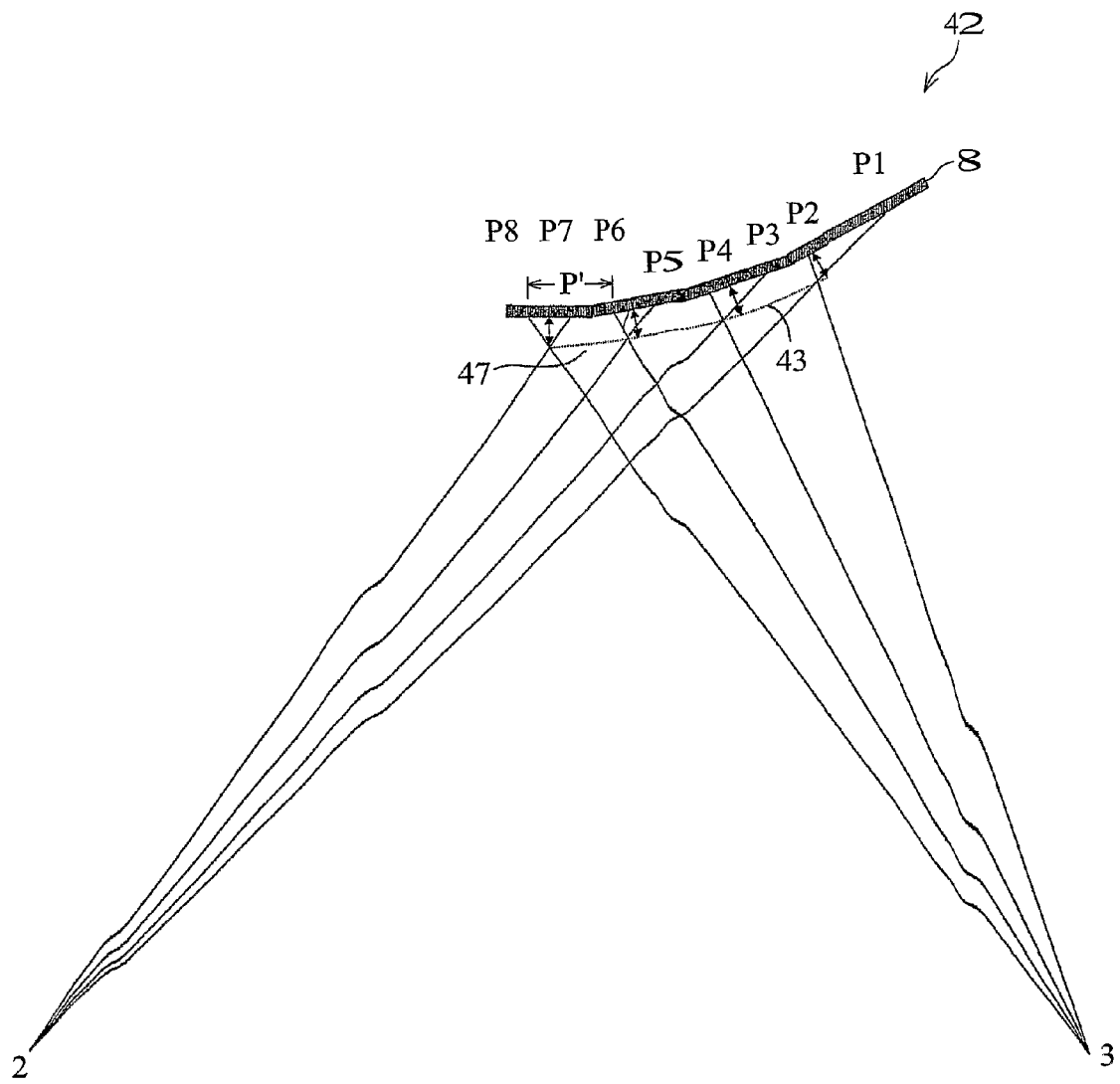
FIG. 11 is a schematic illustration of a multiple view directional display according to a further embodiment of the present invention.

FIG. 11 is a schematic illustration of a display 42 according to a further aspect of the present invention. The display 42 has a pixellated image display layer 8 which is not planar. The image display layer 8 extends into the plane of the paper; it will be assumed for simplicity that the image display layer 8 has a constant curved profile over its depth, but the invention may be applied to a display in which the image display layer has a curved profile that varies over its depth (i.e., that is curved in two dimensions).

In the display 42, the pixels of the image display layer 42 do not have a constant pitch. The "pitch" p' of the image display layer is, in the case of this dual view display, defined as the lateral distance from the centre of one left (or right) pixel to the centre of the next left (or right) pixel. The pitch p' of the image display layer increases from left to right in FIG. 11. The variation in pitch p' is such that the intersection points 19 now lie on a curve 47 which is at a constant distance from the image display layer 43. As a result, it is easier to manufacture the display 42 than it is to manufacture a display such as the display of FIG. 10 in which the spacing the between the parallax barrier and the image display layer varies over the display. The display 42 of FIG. 11 may be made by any suitable manufacturing techniques for a flexible display. For example, the display may be manufactured as a flat display and then curved to shape upon installation.

The pitch of the pixels is determined by the width of the pixels and by the width of the non-transmissive/non-emissive region (or "black mask") between adjacent pixels (the black mask is not shown in FIG. 11). In principle the width of the black mask could be varied to obtain the variation in pixel pitch, while keeping the width of the pixels constant over the display. This may however lead to a variation in brightness over the display. It may therefore be preferable for the width of the pixels to be varied in order to achieve the variation in pixel pitch, as shown in FIG. 11.

By varying the width of the pixels another advantage can be gained. As the angle between the normal axis to a pixel and a viewing direction increases the effective width of the pixel reduces, and this could degrade image quality. However the effect of increasing the pixel width from left to right across the display 42 is that the width of the pixels increases as the angle between the normal to a pixel and the viewing direction increases, thereby keeping the effective width of the pixels as seen by the viewer more uniform.

The way in which the pixels are varied in width to obtain the desired variation in pitch may be selected depending on the curvature of the display and on the intended viewing positions. For example, with a display curved as shown in FIG. 11, a viewer in the left viewing window 2 will see a greater variation in the effective pixel width across the display than will a viewer in the right viewing window 3. Thus, in FIG. 11 the pixel pitch is preferably varied by varying the width of the left pixels, in pixel columns P1, P3, P5 and P7, and keeping the width of the right pixels, in pixel columns P2, P4, P6 and P8, unchanged. Varying the width of the left pixels keeps the effective width of the pixels as seen by a viewer in the left viewing window 2 more uniform.

Figure 12:
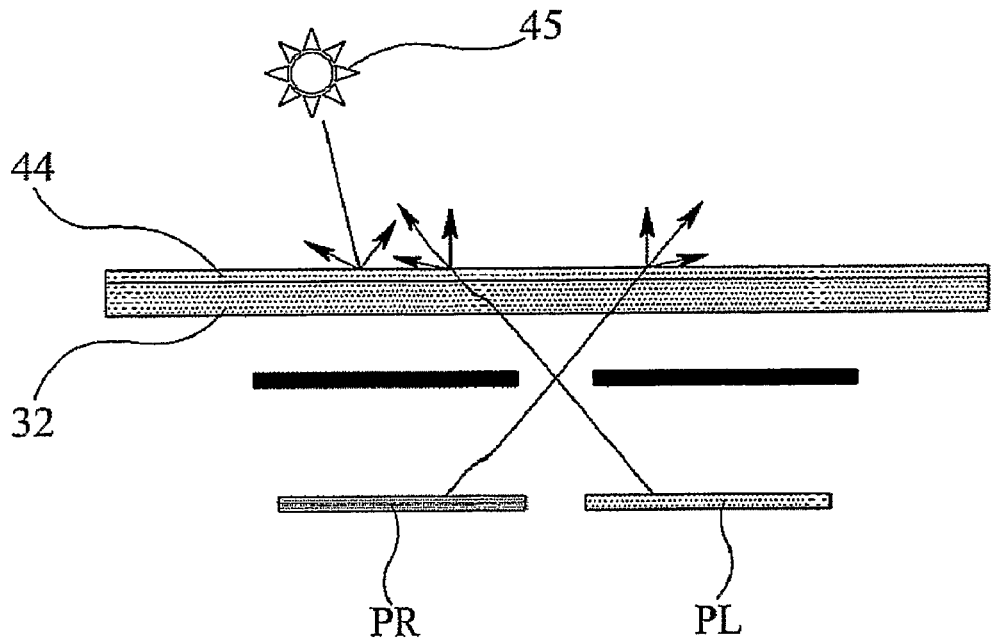
FIG. 12(a) is a schematic plan view of a multiple view directional display.
FIG. 12(b) is a schematic plan view of a multiple view directional display according to a further embodiment of the present invention.
Figure 12:
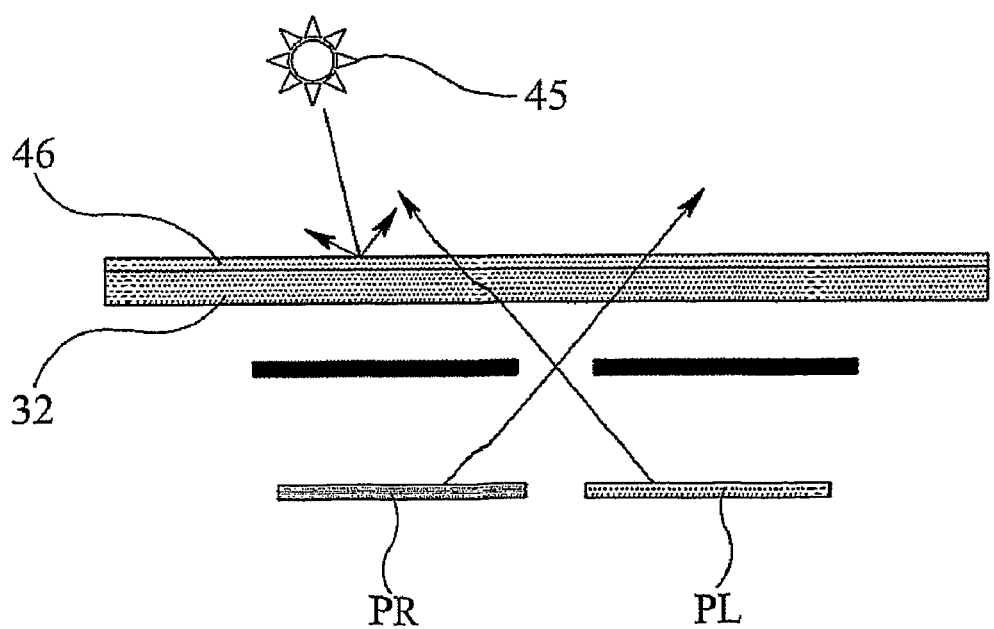

FIG. 12(a) illustrates a further cause of cross-talk in a multiple view directional display. As shown in FIG. 12(a), an anti-glare film 44 is often disposed over the front face of a display, for example over the front face of the output polariser 32 in the case of a display such as the display of FIG. 7(a). The anti-glare film may be, for example, a reflective scattering film that provides diffuse reflection of incident light. The anti-glare film prevents, or minimises, specular reflection of light that is incident on the front face of the display, and so prevents an observer from seeing an image of a bright object such as the sun 45, a window, or another light source.

Applying an anti-glare film to a multiple-view directional display does, however, have a disadvantage. The scattering film 44 will also scatter light that is transmitted through the scattering film, and does not scatter only reflected light. As a result, light from a left (or right) pixel that is correctly directed to the left (or right) viewing window will be scattered by the film 44, and some light will be scattered into the incorrect viewing window. FIG. 12(a) shows that some light travelling to the right window will be scattered into the left viewing window (and vice versa), thus increasing the cross-talk of the display.

According to a further aspect of the present invention, a polarisation-sensitive scattering film 46 is used as the anti-glare film, as shown in FIG. 12(b). A polarisation-sensitive scattering film has no scattering effect on light of one polarisation state, and provides maximum scattering for light of an orthogonal polarisation state. Thus, by using a polarisation-sensitive scattering film that has no scattering effect on light of the linear polarisation passed by the exit polariser 32, light from the right pixel is not significantly scattered as it passes through the scattering film 46, and cross-talk is thereby prevented. The image quality of, for example, a dual view display is therefore unaffected by the polarisation-sensitive scattering film.

The polarisation-sensitive scattering film 46 will scatter approximately 50% of unpolarised light incident on the front face of the display from outside the display, so that a user will not see bright images of the sun 45, a window, a light etc. In particular, incident sunlight is un-polarised and so 50% of incident sunlight will be scattered by the polarisation-sensitive scattering film, thereby significantly reducing the glare that would be caused by strong specular reflection of the sun.

The polarisation-sensitive scattering film 46 of FIG. 12(b) may be applied to a conventional multiple view directional display, or it may be applied to a multiple view directional display according to any previous embodiment of the invention.

In the displays described above, the image display layer has been a transmissive liquid crystal display layer. The invention is not however limited to this, and may be applied to displays with emissive display layers, or to displays with other transmissive display layers.

INDUSTRIAL APPLICABILITY

A display of the present invention may be used in any application where it is desirable for individual users to be able to see different information from the same display. For example, a display of the invention may be used as a display in a motor vehicle, or in a computer game for two or more players.

The invention claimed is:

1. A multiple view directional display comprising:
a pixellated image display layer having a plurality of first pixels assigned to display a first image into a first viewing window and a plurality of second pixels assigned to display a second image into a second viewing window not overlapping the first viewing window; and
an optical element for directing light from the first pixels generally into the first viewing window and for directing light from the second pixels generally into the second viewing window,
wherein the pixellated image display layer is non-planar, and
the pitch of the pixels of the image display layer varies over the area of the image display layer.

2. A display as claimed in claim 1, wherein:
the width of the pixels of the image display layer varies over the area of the image display layer thereby to vary the pitch of the pixels.

3. A display as claimed in claim 2 wherein:
the width of the pixels assigned to a first image varies over the area of the image display layer.

4. A display as claimed in claim 1 wherein:
the pitch of the pixels of the image display layer varies such that, for each pair of a first pixel and adjacent second pixel, the distance from the image display layer to the point of intersection of a line from the centre of the first pixel to the centre of the first viewing window and a line from the centre of the second pixel to the centre of the second viewing window is substantially constant over the area of the display.

5. A display as claimed in claim 4, wherein:
the optical element is a parallax barrier aperture array which is positioned generally coincident with a surface defined by the points of intersection.

6. A display as claimed in claim 5, wherein:
each of the parallax barrier apertures is disposed at a respective one of the points of intersection.

* * * * *